United States Patent
Kongqiao et al.

(10) Patent No.: US 7,583,825 B2
(45) Date of Patent: Sep. 1, 2009

(54) MOBILE COMMUNICATIONS TERMINAL AND METHOD

(75) Inventors: Wang Kongqiao, Beijing (CN); Zou Yanming, Bejing (CN)

(73) Assignee: Nokia Corporation, Espoo (FI)

( * ) Notice: Subject to any disclaimer, the term of this patent is extended or adjusted under 35 U.S.C. 154(b) by 524 days.

(21) Appl. No.: 11/022,601

(22) Filed: Dec. 27, 2004

(65) Prior Publication Data

US 2006/0140479 A1    Jun. 29, 2006

(51) Int. Cl.
G06K 9/00 (2006.01)
(52) U.S. Cl. ...................... 382/119; 382/186
(58) Field of Classification Search ......... 382/313–315, 382/187, 188, 189, 186, 119; 345/173, 179, 345/180–183, 158; 178/18.03
See application file for complete search history.

(56) References Cited

U.S. PATENT DOCUMENTS

| | | | | | |
|---|---|---|---|---|---|
| 4,561,105 | A | * | 12/1985 | Crane et al. | 382/185 |
| 5,392,363 | A | * | 2/1995 | Fujisaki et al. | 382/187 |
| 5,940,064 | A | * | 8/1999 | Kai et al. | 345/173 |
| 6,487,310 | B1 | * | 11/2002 | Bishop et al. | 382/186 |
| 6,724,936 | B1 | * | 4/2004 | Riemer | 382/186 |
| 7,013,046 | B2 | * | 3/2006 | Kawamura et al. | 382/186 |
| 2003/0223640 | A1 | | 12/2003 | Homiller | 382/219 |

* cited by examiner

Primary Examiner—Brian Q Le
(74) Attorney, Agent, or Firm—Perman & Green LLP

(57) ABSTRACT

Handwriting recognition is performed by sensing a trace signal, where the trace represents a handwritten intended symbol. A digital representation of the trace signal is then stored and compared with a plurality of candidate symbols. Depending on the outcome of the comparison, a best candidate symbol among the candidate symbols is recognized and displayed, or the digital representation of the trace signal is displayed.

13 Claims, 2 Drawing Sheets

MOBILE COMMUNICATIONS TERMINAL AND METHOD

BACKGROUND OF THE INVENTION

1. Field of the Invention

The present invention relates to a method and apparatus as well as a computer program for handwriting recognition, in particular handwriting recognition in a mobile communication device.

2. Brief Description of Related Developments

Mobile telephones have evolved during the last few years from being simple voice communication devices to present day intelligent communication terminals having processing and communication capabilities that were almost unimaginable not long ago. Needless to say, the use of a mobile telephone now involves such communication intensive activities as sending e-mail messages, browsing the World Wide Web as well as other activities such as managing calendar functions and playing games. A strong driving force during the development of present day communication devices has been that of user demand for miniaturization and reduced weight. This has, however, resulted in manufacturers of devices having been forced to compromise between physical size and usability in terms of providing an easy to use user interface. For example, a typical mobile telephone is equipped with a small keypad, often comprising no more than fifteen small keys that have multiple input functions.

A problem relating to present day communication devices is hence that of providing an easy way of inputting text into a communication device, e.g. text input when recording information in a calendar application or text input when composing an e-mail message or a Short Message Service (SMS) message.

Prior art methods and devices have approached this problem in a number of different ways. One example is that of utilizing a touch sensitive display on which a user enters text and other input information by writing with, e.g., a small stylus as if writing with a pen on paper. The movement of the stylus along a trace over the touch sensitive display generates a trace signal that is digitized and analyzed by handwriting recognition software. One example of such a prior art arrangement is found in US patent application publication 2003/0223640 A1, in which apparatus and methods, computer program products for editing handwritten symbols using alternative known symbols are described. In US 2003/0223640 A1 a symbol provided by a user is sensed and compared with a set of known symbols. A first symbol among the known symbols is displayed and if the user finds that the shown symbol does not correspond to the symbol provided by the user, an alternative second known symbol or a number of other known symbols are displayed for selection by the user.

A drawback with the method disclosed in US 2003/0223640 A1 is that the process of inputting symbols to the apparatus is slow because the user is forced to interrupt the input of handwritten symbols and select among different known candidate symbols when the comparison result is ambiguous.

SUMMARY OF THE INVENTION

An object of the present invention is hence to overcome the drawbacks with prior art handwriting recognition methods and systems, and in particular to overcome problems relating to the rate at which a user is allowed to enter symbols into a handwriting recognition system.

This object is achieved by way of a method according to claim 1 and a mobile communication device according to claim 6 as well as a computer program according to claim 8.

That is, a method of handwriting recognition according to a first aspect of the present invention comprises sensing a trace signal, where said trace represents a handwritten intended symbol. A digital representation of the trace signal is then stored and compared with a plurality of candidate symbols. Depending on the outcome of the comparison, a best candidate symbol among the candidate symbols is recognised as the intended symbol and displayed, or the digital representation of the trace signal is displayed.

This has an advantage of enabling high speed input of handwritten symbols since erroneous results from comparisons with candidate symbols are avoided. That is, only comparison results that are successful are accepted and result in the recognition of an intended symbol; all other comparison results result in displaying the trace signal.

Moreover, it is to be noted that there is no need to display any candidate symbol, as in the prior art, when the comparison between trace and candidate symbols leads to recognition difficulties. The digital representation of the trace signal is chosen and displayed instead, without need for displaying one or more candidate symbols to choose from. This has an advantage in that it relieves a user from the burden of having to decide whether or not a symbol is correctly recognized. Another advantage is that the display device need not be very large. That is, the method according to the invention is particularly advantageous when utilized in a small handheld device such as a mobile telephone.

A general advantage of the present invention is hence that it speeds up text input. It is therefore particularly suitable in scenarios where the time for writing is very tight or the informal format of a document is acceptable. For example, taking notes at a conference or presentation, writing SMS, preparing drafts of a speech etc.

Preferably, the comparison of the digital representation of the trace signal with a plurality of candidate symbols involves calculation of a confidence value and comparison with a confidence threshold. The best candidate symbol among the candidate symbols is then recognised if the calculated confidence value is greater than the confidence threshold.

This has an advantage in that, by selecting an optimal threshold level, erroneous results from comparisons with candidate symbols may be avoided even further. That is, only comparison results that have a high level of confidence are accepted and result in the recognition of an intended symbol; all other comparison results, yielding a low confidence level, result in displaying the trace signal.

The method may in other preferred embodiments further comprise sensing a correction signal and in response to the correction signal displaying the digital representation of the trace signal instead of the best candidate symbol.

That is, a user may in the case the comparison has resulted in an erroneous recognition generate a signal, e.g. by tapping on the touch sensitive display, replace the erroneous symbol with the trace signal. This is advantageous in that it is quick to perform, as compared to prior art methods where the user typically has to select among a plurality of other candidate symbols.

The method is preferably performed repeatedly and thereby display at least one symbol or a digital representation of at least one trace signal. Context sensing is then performed using the at least one symbol or the digital representation of the at least one trace signal to improve recognition of any of said at least one symbol or digital representation of at least one trace signal.

That is, when a user writes a sequence of intended symbols, results from comparisons with candidate symbols that have resulted in the display of a trace signal instead of the intended symbol may be replaced by the intended symbol automatically with the help of context sensing, or an improved recognition of an already recognized symbol is obtained. Context sensing is typically increasingly effective as the sequence of intended symbols input by the user gets longer and hence this preferred embodiment has the advantage that it provides increased efficiency in recognizing the intended symbols input by the user.

According to other aspects of the invention, a mobile communication device and a computer program show the same advantages as those discussed above in connection with the method of handwriting recognition.

DETAILED DESCRIPTION OF PREFERRED EMBODIMENTS

Figure 1:
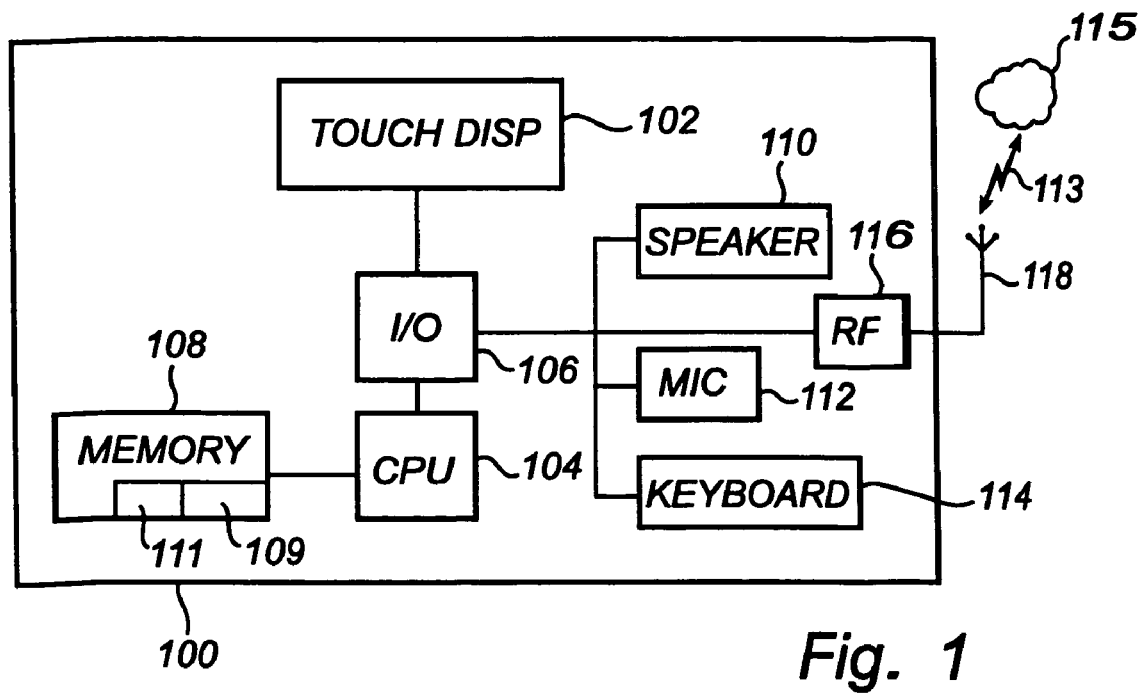
FIG. 1 shows a schematically drawn block diagram of an embodiment of a mobile communication device according to the present invention.

FIG. 1 illustrates schematically a communication device in the form of a mobile telephone terminal 100 in which the present invention is implemented. The telephone 100 is capable of communication via an RF-unit 116 and an antenna 118 through an air interface 113 with a mobile (radio) communication system 115 such as the well known systems GSM/GPRS, UMTS, CDMA 2000 etc.

The terminal 100 comprises a processor 104, memory 108 as well as input/output units in the form of a speaker 110, a microphone 112, a keyboard 114. and a touch sensitive display 102 on which a user writes using, e.g., a stylus or similar device. The input/output units communicate with the processor 104 through an I/O-interface 106. The details regarding how these units communicate are known to the skilled person and is therefore not discussed further. The communication terminal 100 may, in addition to the illustrated mobile telephone terminal, a Personal Digital Assistant (PDA) equipped with radio communication means.

The method according to the preferred embodiments of the present invention will in general reside in the form of software instructions of a computer program 109 with an associated memory area 111, together with other software components necessary for the operation of the terminal 100, in the memory 108 of the terminal 100. The computer program 109 may be resident or it may be loaded into the memory 108 from a software provider, e.g. via the air interface 113 and the network 115, by way of methods known to the skilled person. The program 109 will be executed by the processor 104, which will receive and process input data from the different units in the terminal 100, particularly input data in the form of trace signals from the touch sensitive display 102, as will be discussed below.

Figure 2:
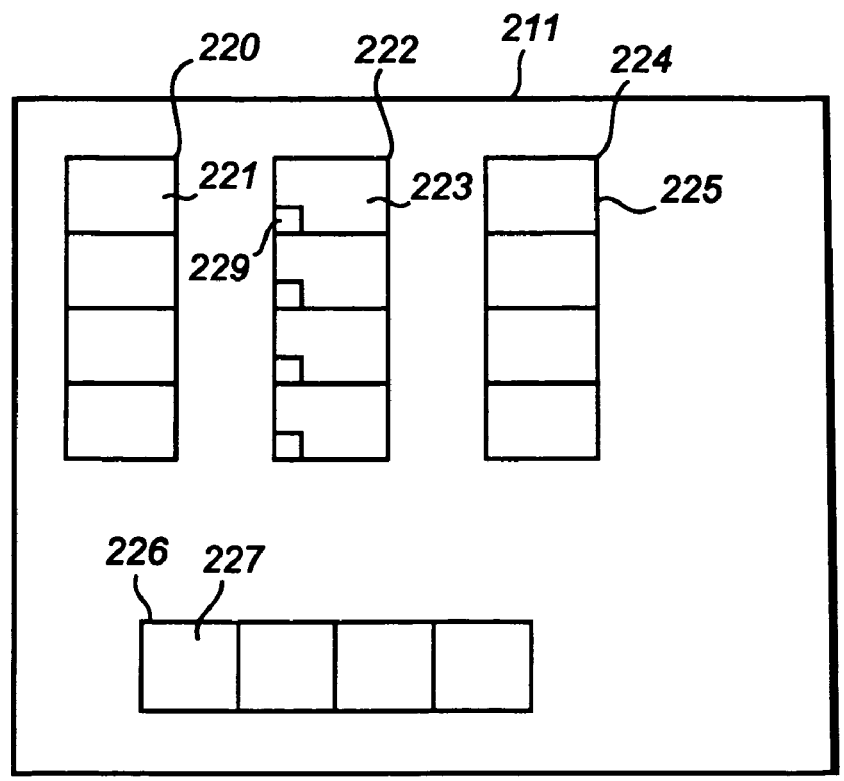
FIG. 2 illustrates a disposition of memory content used according to an embodiment the present invention.

A method according to the present invention will now be described with reference to FIGS. 2 and 3. The method will typically be realized by means of a computer program, e.g. the computer program 109 discussed above in connection with FIG. 1. The computer program 109 will utilize a part of memory 211, e.g. corresponding to the memory area 111 in FIG. 1. An example of a configuration of the memory part 211 is schematically illustrated in FIG. 2.

A first buffer 220 is configured with a plurality of storage positions, here four positions, of which one position is denoted by reference numeral 221. The first buffer 220 is configured to store digitized trace signals that are generated by the touch sensitive display (102 in FIG. 1) when a user writes and forms an intended symbol on the touch sensitive display.

A second buffer 222 is also configured with a plurality of storage positions, of which one position is denoted by reference numeral 223. The second buffer 222 is configured to store a best candidate symbol that the computer program provides after comparing a trace signal with candidate symbols. The second buffer 222 is also configured to store a respective confidence value for each stored best candidate symbol, as indicated by a subpart 229 of the buffer position 223. The buffer could naturally also be arranged to store a list of candidates and their respective confidence values. The list could for example contain up to 10 candidates, but other sizes of the list are also possible.

A third buffer 224 is also configured with a plurality of storage positions, of which one position is denoted by reference numeral 225. The third buffer 224 is configured to store best candidate symbols as well as digitized trace signals. That is, any position 225 in the third buffer may at any given time hold a symbol or a digitized trace signal. Moreover, the third buffer 224 is further configured, via interaction with the computer program (109 in FIG. 1) and the display (102 in FIG. 1), to be displayed on the display (102 in FIG. 1). That is, at least one position 225 is displayed. Depending on the size of the display, any number of third buffer positions may be displayed at any given time.

The first buffer 220, second buffer 222 and the third buffer 224 are all so-called first in-first out (FIFO) buffers. That is, when writing information into any one of these buffers, when full of information, the information having been stored the longest time (i.e. the "oldest" content) is discarded from the buffer.

An output buffer 226, having storage positions such as a position denoted by reference numeral 227, acts as an interface to any software application that is to receive the user input. An example of such an application is a text editor associated with an e-mail application or an SMS-application. As will be described below, content from the third buffer 224 is regularly transferred to the output buffer 226.

As the skilled person will realize, any other number of buffer positions than the four positions illustrated here, may be used in alternative embodiments of the invention.

Figure 3:
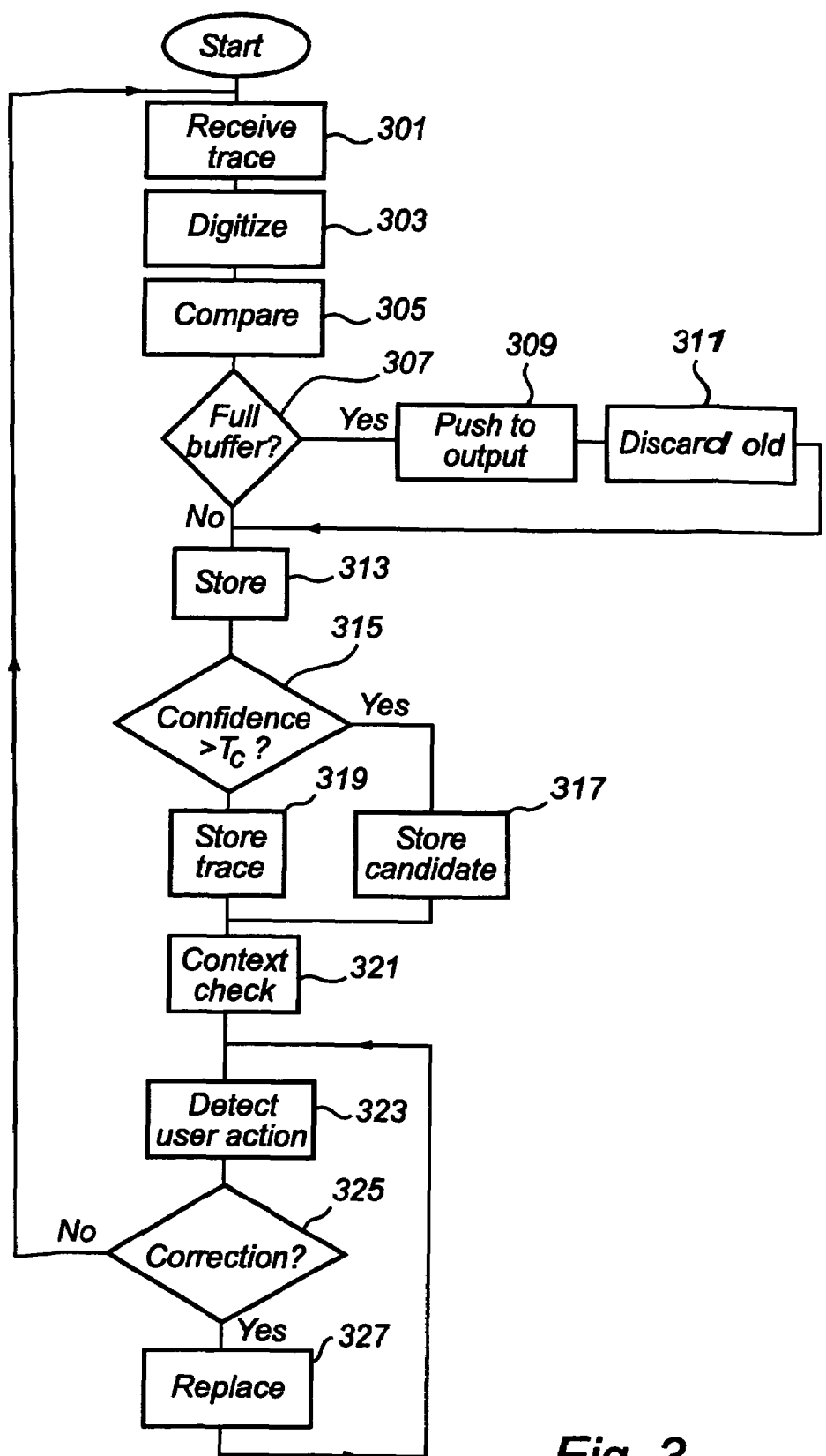
FIG. 3 is a flow chart illustrating an embodiment of a method according to the present invention.

Turning now to FIG. 3, a method according to the present invention will be described by way of a flow chart of steps that are performed in the computer program (109 in FIG. 1).

In a reception step 301 a trace signal is received from the touch sensitive display (102 in FIG. 1) when a user writes an intended symbol on the display, using a suitable implement such as a writing stylus. The signal is generated, as the skilled person will realize, by way of interaction between the hardware in the form of sensor circuitry in the display and display control software executed in the processor (104 in FIG. 1).

In a digitizing step 303, the received trace signal is digitized, i.e. subjected to analog-to-digital conversion as is known in the art. Depending on the implementation, the digitized trace signal may be encoded, e.g. compressed, before being stored.

In a comparison step 305, the digitized trace signal stored in the first buffer is compared with a number of candidate symbols in order to recognize at least one candidate symbol that resembles the trace signal. During this step, a confidence value that corresponds to a measure of how well the trace signal matches the candidate symbols is calculated for each candidate symbol.

A check is then made, in a checking step 307, whether the third buffer 224 is full or not. If the third buffer 224 is full, the "oldest" content of the third buffer 224 is pushed 309 to the output buffer 226 and the "oldest" content of the first buffer 220 and the "oldest" content in the second buffer 222 are discarded 311, thereby freeing storage space in each of these (FIFO) buffers.

If, in the checking step 307, it was found that the third buffer 224 was not full, or after the push step 309 and the discard step 311, a storage step 313 takes place. During the storage step 313, the digitized trace signal is stored in the first buffer 220 and the best candidate symbol, which was determined in the comparison step 305, and its associated confidence value are stored in the second buffer 222.

Then, in a checking step 315, the confidence value of the best candidate symbol is compared with a predetermined confidence threshold Tc and, if the confidence value is less than or equal to the threshold Tc, the digitized trace signal is stored 319 in the third buffer 224. If, on the other hand, the confidence value of the best candidate symbol is greater than the confidence threshold Tc, the best candidate symbol is stored 317 in the third buffer 224.

A context check 321 is then performed on the contents of the third buffer 224. As the skilled person will realize, such context checking may involve usage of any predetermined rules, such as grammar.

In the context check in step 321 the content of buffer 224 may be changed. If the confidence is changed due to the content checking the new confidences will be compared to the threshold and the content of the buffer may be changed based on the comparison.

In an action detection step 323 any signal that the user may generate to signal that he/she wishes to change the content of any of the positions of the third buffer 224. That is, remembering that the content of the third buffer 224 is at least partly displayed on the display, the user may find that one or more of the best candidate symbols that are displayed, have erroneously been determined to be the intended symbol during the comparison step 305 (and hence stored in the third buffer 224 during storage step 317). Having found the error, the user may signal by touching the touch sensitive display at a specific position, e.g. at the position of the display of the erroneously determined symbol, and thereby provide a signal to the computer program that a correction is desired.

The check whether the signal received is a correction signal is performed in a checking step 325. If it is determined that there is no correction signal, the method returns to the initial step of receiving 301 a trace signal.

If it is determined, during the checking step 325, that a correction signal is received, the contents of the third buffer at the buffer position which corresponds to the position of the display of the erroneously determined symbol is replaced with the contents of the first buffer 220 at the corresponding position. That is, the erroneously determined symbol is replaced by the digitized trace signal at the position indicated by the user touching the display. The method then returns to the action detection step 323.

The invention claimed is:

1. A method of handwriting recognition comprising:
using a computer to perform the following:
representing a handwritten intended symbol by a trace signal in a handwriting recognizer,
sensing the trace signal,
storing a digital representation of the trace signal,
comparing the digital representation of the trace signal with a plurality of candidate symbols, the comparing providing one of two possible results alternatively wherein a first of said results is recognition of a best candidate symbol among the candidate symbols, and the second of said results is an absence of recognition of a best candidate symbol among the candidate symbols,
depending on the outcome of the comparison, displaying the best candidate symbol upon obtaining said recognition of the best candidate, and displaying the digital representation of the trace signal upon said absence of recognition of a best candidates,
in a case the best candidate symbol is displayed:
sensing a correction signal pertaining to said best candidate symbol, and
in response to the correction signal. displaying the digital representation of the trace signal instead of the best candidate symbol.

2. The method according to claim 1, wherein said comparison involves calculation of a confidence value and comparison with a confidence threshold and where the best candidate symbol among the candidate symbols is recognised if the calculated confidence value is greater than the confidence threshold.

3. The method according to claim 1, repeatedly performed and thereby displaying at least one symbol or a digital representation of at least one trace signal, further comprising:
performing context sensing using the at least one symbol or the digital representation of the at least one trace signal to improve recognition of any of said at least one symbol or digital representation of at least one trace signal.

4. The method according to claim 3, wherein the display of the at least one symbol or the digital representation of the at least one trace signal is replaced by the display of a replacement symbol.

5. A mobile communication device configured to control handwriting recognition, comprising:
a sensor for sensing a trace signal, said trace representing a handwritten intended symbol,
a memory for storing a digital representation of the trace signal,
a processor for comparing the digital representation of the trace signal with a plurality of candidate symbols, the comparing providing one of two possible results alternatively wherein a first of said results is recognition of a best candidate symbol among the candidate symbols, and the second of said results is an absence of recognition of a best candidate symbol among the candidate symbols,
a display operative, depending on the outcome of the comparison, for displaying the best candidate symbol upon obtaining said recognition of the best candidate, and displaying the digital representation of the trace signal upon said absence of recognition of a best candidate,
a sensor for sensing a correction signal, pertaining to said best candidate symbol, in a case that the best candidate symbol is displayed, and
a display for displaying, in response to the correction signal, the digital representation of the trace signal instead of the best candidate symbol.

6. A mobile communication device, according to claim 5, wherein, upon successive comparisons of the digital representation of the trace signal with a plurality of candidate symbols, for displaying at least one symbol or a digital representation of at least one trace signal, the processor performs context sensing using the at least one symbol or the digital representation of the at least one trace signal to improve recognition of any of said at least one symbol or digital representation of at least one trace signal.

7. A mobile communication device, according to claim 6, wherein the display of the at least one symbol or the digital representation of the at least one trace signal is replaced by the display of a replacement symbol.

8. A computer readable medium having stored therein a program comprising:
   computer readable code embodied therein for causing a computer to recognize handwriting, the computer readable code further enabling the computer:
   to sense a trace signal, said trace representing a handwritten intended symbol;
   to store a digital representation of the trace signal;
   to compare the digital representation of the trace signal with a plurality of candidate symbols, the comparing providing one of two possible results alternatively wherein a first of said results is recognition of a best candidate symbol among the candidate symbols, and the second of said results is an absence of recognition of a best candidate symbol among the candidate symbols;
   depending on the outcome of the comparison, to recognize a best candidate symbol among the candidate symbols and display the best candidate symbol upon obtaining said recognition of the best candidate, and to display the digital representation of the trace signal upon said absence of recognition of a best candidate, and
   in a case the best candidate symbol is displayed:
   sensing a correction signal pertaining to said best candidate symbol, and
   in response to the correction signal. displaying the digital representation of the trace signal instead of the best candidate symbol.

9. A computer readable medium having stored therein a program, according to claim 8, wherein, upon successive comparisons of the digital representation of the trace signal with a plurality of candidate symbols, and thereby displaying at least one symbol or a digital representation of at least one trace signal, the computer
   performs context sensing using the at least one symbol or the digital representation of the at least one trace signal to improve recognition of any of said at least one symbol or digital representation of at least one trace signal.

10. A computer readable medium having stored therein a program, according to claim 9, wherein the display of the at least one symbol or the digital representation of the at least one trace signal is replaced by the display of a replacement symbol.

11. A mobile communication device configured to control handwriting recognition, comprising:
   a sensor for sensing a trace signal, said trace representing a handwritten intended symbol,
   a memory for storing a digital representation of the trace signal,
   a processor for comparing the digital representation of the trace signal with a plurality of candidate symbols, wherein
   the processor is further configured to recognize a best candidate symbol among the candidate symbols, depending on the outcome of the comparison,
   a display for displaying the best candidate symbol, the display displaying the digital representation of the trace signal if the processor does not recognize the best candidate symbol,
   wherein, in a case the best candidate symbol is displayed, the sensor is further configured to sense a correct signal pertaining to said best candidate symbol, and
   the display is further configured to display the digital representation of the trace signal instead of the best candidate symbol in response to the correct signal.

12. A mobile communication device configured to control handwriting recognition, according to claim 11, wherein, upon successive comparisons of the digital representation of at least one trace signal with a plurality of candidate symbols, for displaying at least one symbol or a digital representation of the at least one trace signal, the processor
   performs context sensing using the at least one symbol or the digital representation of the at least one trace signal to improve recognition of any of said at least one symbol or digital representation of at least one trace signal.

13. A mobile communication device configured to control handwriting recognition, according to claim 12, wherein the display of the at least one symbol or the digital representation of the at least one trace signal is replaced by the display of a replacement symbol.

* * * * *

UNITED STATES PATENT AND TRADEMARK OFFICE
CERTIFICATE OF CORRECTION

PATENT NO. : 7,583,825 B2  Page 1 of 1
APPLICATION NO. : 11/022601
DATED : September 1, 2009
INVENTOR(S) : Kongqiao et al.

It is certified that error appears in the above-identified patent and that said Letters Patent is hereby corrected as shown below:

Column 6, line 13, delete "candidates" and insert --candidate-- therefor.
    Column 6, line 17, delete "signal." and insert --signal,-- therefor.
    Column 7, line 33, delete "signal." and insert --signal,-- therefor.

Signed and Sealed this

Fifteenth Day of June, 2010

David J. Kappos
*Director of the United States Patent and Trademark Office*